United States Patent [19]

Jones

[11] Patent Number: 4,945,353

[45] Date of Patent: Jul. 31, 1990

[54] TELEMETRY SYSTEM USED WITH SENSING DEVICES

[75] Inventor: Raymond Jones, Marshfield, Mass.

[73] Assignee: C&K Components, Inc., Newton, Mass.

[21] Appl. No.: 272,319

[22] Filed: Nov. 17, 1988

[51] Int. Cl.$^5$ .............................................. H04Q 9/00
[52] U.S. Cl. ......................... 340/825.070; 340/310 R; 307/40
[58] Field of Search ............... 340/310 R, 310 A, 505, 340/825.54, 825.07, 870.39; 307/38, 39, 40, 41

[56] References Cited

U.S. PATENT DOCUMENTS

| | | | |
|---|---|---|---|
| 4,093,946 | 6/1978 | Fowler | 340/310 R |
| 4,540,890 | 9/1985 | Gangemi et al. | 340/310 R |

*Primary Examiner*—Donald J. Yusko
*Assistant Examiner*—Peter S. Weissman

[57] ABSTRACT

A system whereby the operating power for a series of sensor elements and their status may be reported along a single twisted pair connecting line. The connecting line is protected from addition or deletion of the required sensors to insure the security of the connections. The system has the ability to determine the connection of added sensors, even when they share common identification information.

3 Claims, 6 Drawing Sheets

TELEMETRY SYSTEM USED WITH SENSING DEVICES

BACKGROUND OF THE INVENTION

Field of the Invention

This invention relates to telemetry systems and more specifically to telemetry systems used with sensing devices.

SUMMARY OF THE INVENTION

A system is described whereby the operating power for a series of sensor elements and their status may be reported along a single twisted pair connecting line. The connecting line is protected from addition or deletion of the required sensors to insure the security of the connections. The system has the ability to determine the connection of added sensors, even when they share common identification information.

BRIEF DESCRIPTION OF THE DRAWINGS

Further details are explained below with the help of the example(s) illustrated in the attached drawings in which.

DESCRIPTION OF THE PREFERRED EMBODIMENT(S)

Figure 1:
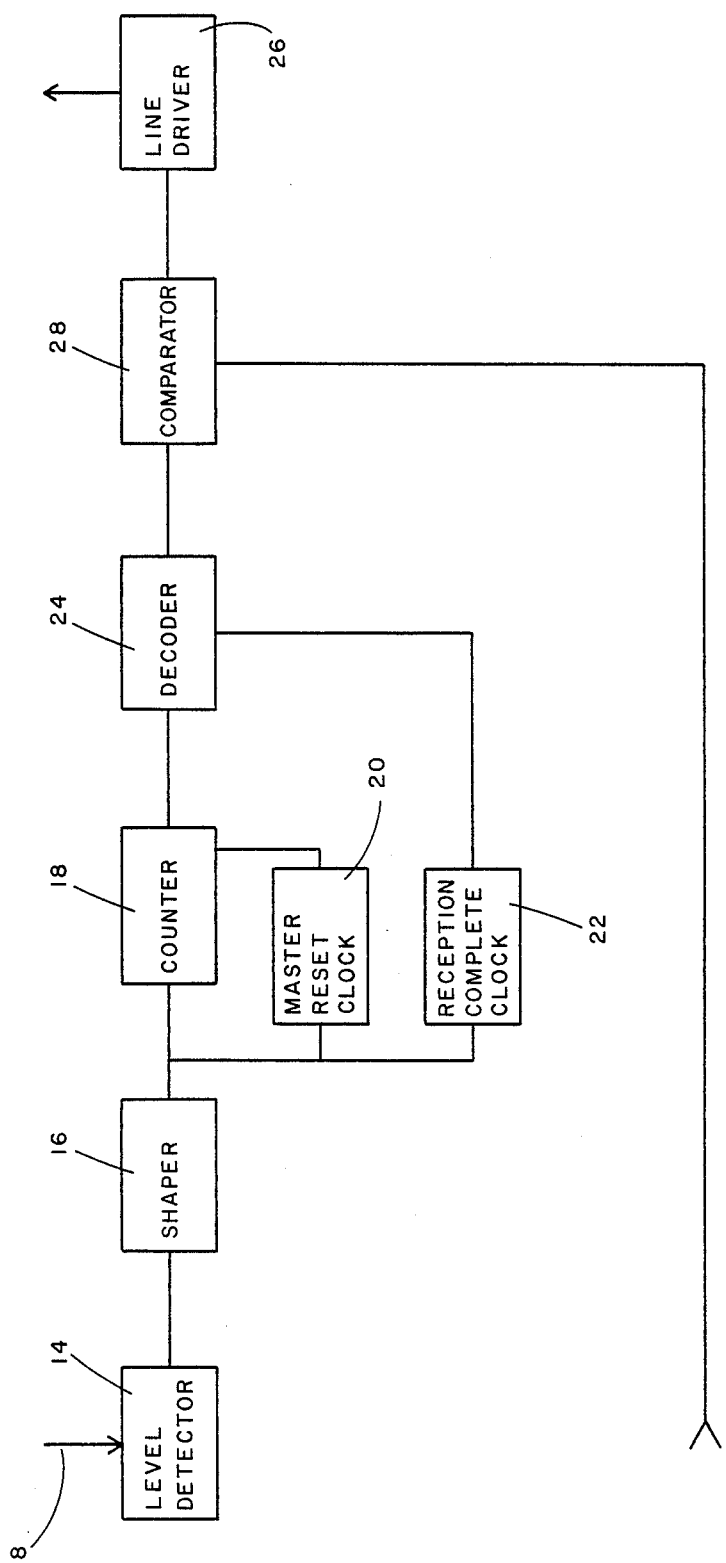
FIG. 1. is a block diagram of the telemetry system according to the present invention.

There is shown in the drawings at FIGS. 1–5 a telemetry system, which is divided into three parts, a central control portion, a transponder 12 and a display portion.

Block diagram FIG. 1 contains the aspects involving the transponder 12. Any number of these transponding elements may be connected to the system, all of the transponders are electrically identical and differ only in the selection of identification information. The enabling input of the transponder is connected to a sensing device whose status is to be reported by the system. Power, if required by the sensor element is supplied by the transponder at the power terminals. The sensing device may be a remote key pad, switches, or an active sensor for motion, heat, light etc. (not shown). Anything which has an on-off state can be connected to the enable line. The connected device can be active or passive. The device is a reporting and powering system and not in itself an alarm.

The basic operating principal of the system involves pulsed modulation of the power supply to the connected transponder devices. We apply, for example, 12 volts DC from the controller section to the power line 8, comprising lines 8a and 8b, to supply power for the sensors, key pad or other remote devices. The transponder 12 is alerted by taking the power that is normally present on the power line 8 and pulsing it momentarily with an encoded signal. The transmitted signal is actually formed from the absence of DC power. Hereinafter the transponder response will be discussed by indicating the effects of the momentary interruptions of the power supply.

The transponder 12 is a transceiver which receives a signal from the central controller and then responds appropriately by either sending back an acknowledgment signal or not. The transponder 12 comprises a level detector 14, a shaper 16, a counter 18, a master reset clock 20, a reception complete clock 22, a decoder 24, a line driver 26 and a comparator 28. The signaling method, broadly speaking, is accomplished by examination of the voltage level on the power line 8 by the level detector 14, if the power is removed from the line 8, this fact is detected after the voltage falls below a predetermined cut-off value. The cut-off value is selected by components within the level detector 14. When the voltage falls below the predetermined threshold the level detector 14 responds by generating a pulse. The pulses are passed into the shaper 16 the purpose of which is to square the pulse, prior to further processing and provide necessary operating currents for other stages. The signal is then processed by the remaining blocks in the transponder 12. The signal is simultaneously passed to a counter 18 which counts the number of pulses passing along the power line 8 and to a pair of timing blocks. The first timing element is referred to as the master reset clock 20 and the second the reception complete clock 22. These two time delay devices 22, 24 provide the method for decoding the pulses sent along the power line 8. For example, starting at point in time long after the last pulse has been applied to the power line 8 when the system is reset and the counter 18 is initialized at zero; a pulse is applied to the power line 8 by the controller section; the level detector 14 detects the signal, the shaper 16 squares and amplifies the signal and the counter 18 counts the pulse. As long as pulses continue to be applied to the power line within a predetermined amount of time the master reset clock 20 and the reception complete clock 22 are held in the non-reset condition. Sometime after the reception of what will be the last pulse, after a delay period sufficient to cause the reception complete clock 22 to time out but not sufficient to allow the master reset clock 20 to time out, there is a period during which the transponder unit may respond. Response of the unit during this time period is determined by the state of the enable comparator block and the address currently on the counter 18. When and only when the address loaded in the decoder switch 24 and present on the counter output 18 are the same and the transponder 12 is not inhibited by the enabling comparator 28 the transponder 12 will respond to the addressing by placing a signal on the power line 8 consisting of a current draw of approximately 1 ampere supplied by the enabling line driver 26.

Figure 2:
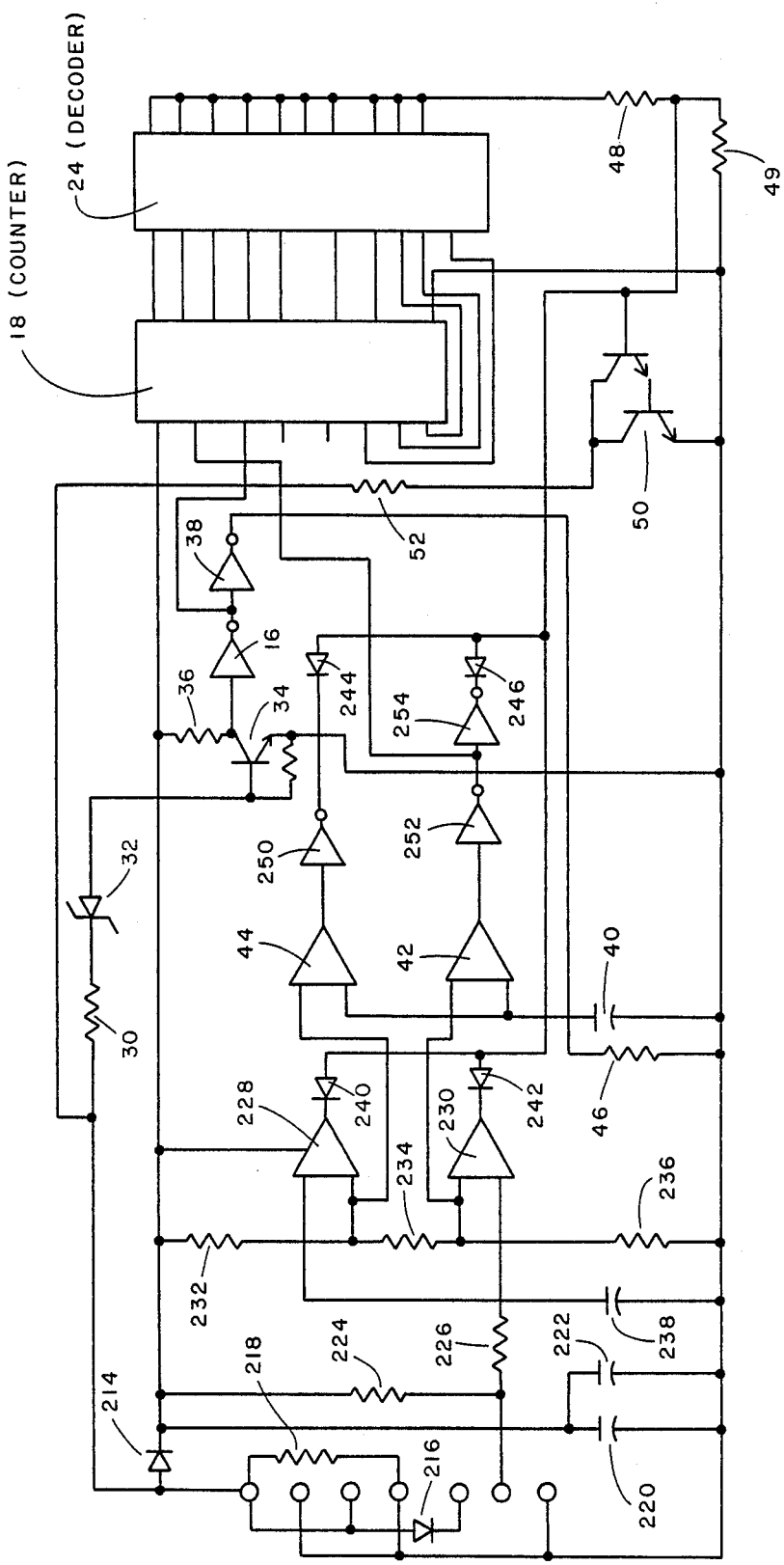
FIG. 2. is a schematic of the transponder of the telemetry system shown in FIG. 1.

Describing the system specifically and referring to FIG. 2, the resistor 30 and the zener diode 32 are connected in series to the base of transistor 34. These elements insure that a potential greater than some specific value will be present on power line 8 to provide base drive to transistor 34. The transistor 34 will be in conduction if line 8 is sufficiently high in potential to overcome the zener voltage of the diode 32 and the base emitter junction of the transistor 34 in series. Typically, for the system disclosed herein the approximate values would be 6 volts for the zener diode 32 plus the value of the base emitter voltage of the transistor 34 which means that for the transistor 34 to conduct, the line 8 will have a potential on it greater than for example 7 volts. In such a case transistor 34 will conduct and a voltage drop will occur across the collector resistor 36. Essentially no potential will exist at the junction of resistor 36 and the collector of transistor 34 thus, no potential will be applied to the input of gate 16 used as a wave shaper. If the potential of line 8 drops below for example 5 volts, transistor 34 will go out of conduction and the potential at its collector will rise. The input of the inverting gate (shaper) 16 will then have a high potential applied. The output of the wave shaper 16 is applied to the input of the master reset clock 20 through an inverting buffer gate 38 and thence into a capacitor 40. When the signal first goes high upon receiving a pulse from the line 8 the gate 38 supplies charging current to the capacitor 40 which is raised to a high potential. This high potential is applied to the input of comparator amplifiers 42 and 44 which form the master reset clock 20 and the reception complete clock 22. If the input of master reset comparator 42 is high the reset on the counter 18 is disabled and the counter 18 is ready to accept pulses. The input on the reception complete clock 22 is brought high as well and the resulting output is applied to the decoder switch 24. A low output of the reception complete clock 22 disables the output of the transponder 12. When power is restored to the line 8, the wave shaper 16 will resume its initial state since the transistor 34 will be turned on. The input of wave shaper 16 will fall causing the counter 18 to increment. This being the first pulse received the output of the counter 18 will be equivalent to position one. Potential will then be removed from the output of gate 38, capacitor 40 will cease charging through gate 38 and will start discharging through a resistor 46. As the voltage across the capacitor 40 starts to decrease, the voltage applied to the comparators 42, 44 also falls. If a second pulse is not sent within a fixed amount of time, which is determined by values of the capacitor 40 and the resistor 46 the voltage at the input of comparators 42, 44 will fall to the point where the reception complete clock 22 will change state enabling decoder switch 24 and should the number one address be selected on the decoder switch 24 (i.e. if the dip switch equivalent to address number 1 be closed) the output from the counter 18 from position 1 would be conducted through the dip switch, through a resistor 48 to the base of a darlington transistor 50. Current will flow through a resistor 52 into the collector of the transistor 50 from the line 8. This results in a known current flowing through the resistor 52. In this case equivalent to one ampere. This known current is supplied by the line 8. The current will pass through resistor 52 until discharge of the timing capacitor 40 results in reset of counter 18. To summarize, if the unit decodes to 1 (i.e. it has an address of 1) and it is allowed to time out at the end of one pulse, the unit will respond by putting a 1 ampere current pulse on the line 8 sometime after it was addressed if the enable condition is satisfied. It is important to note, at this time, that this address is not intended to be synchronous. It occurs at a time period after the conclusion of the addressing period. Going back to the input sequence for a moment, if a second pulse had occurred prior to the time out of the reception complete comparator the process of raising the counter 18 input would have been repeated. The capacitor 40 would have been recharged through gate 38 and the act of releasing the output would not have occurred because the reception complete clock 22 would have stayed in conduction. Under these circumstances if this were device number one and we were actually addressing device number two, we would have passed by device number one, even though device number one was decoded by the counter 18. At that particular point in time the reception complete clock 22 would have shunted the signal away from the transistor 50 and the unit would not have sent the response pulse. Each of the addresses can thus be scanned in any order. Further if the unit is disabled by the comparator 28, this will have the same effect as if the device had not been addressed properly (i.e. the unit will not send out the response pulse). If the unit is physically disconnected from the line 8, no return pulse will be sent, also triggering the indicator which is part of the display section. The counter 18 may be changed to provide different total numbers of addresses, if desired.

Figure 4:
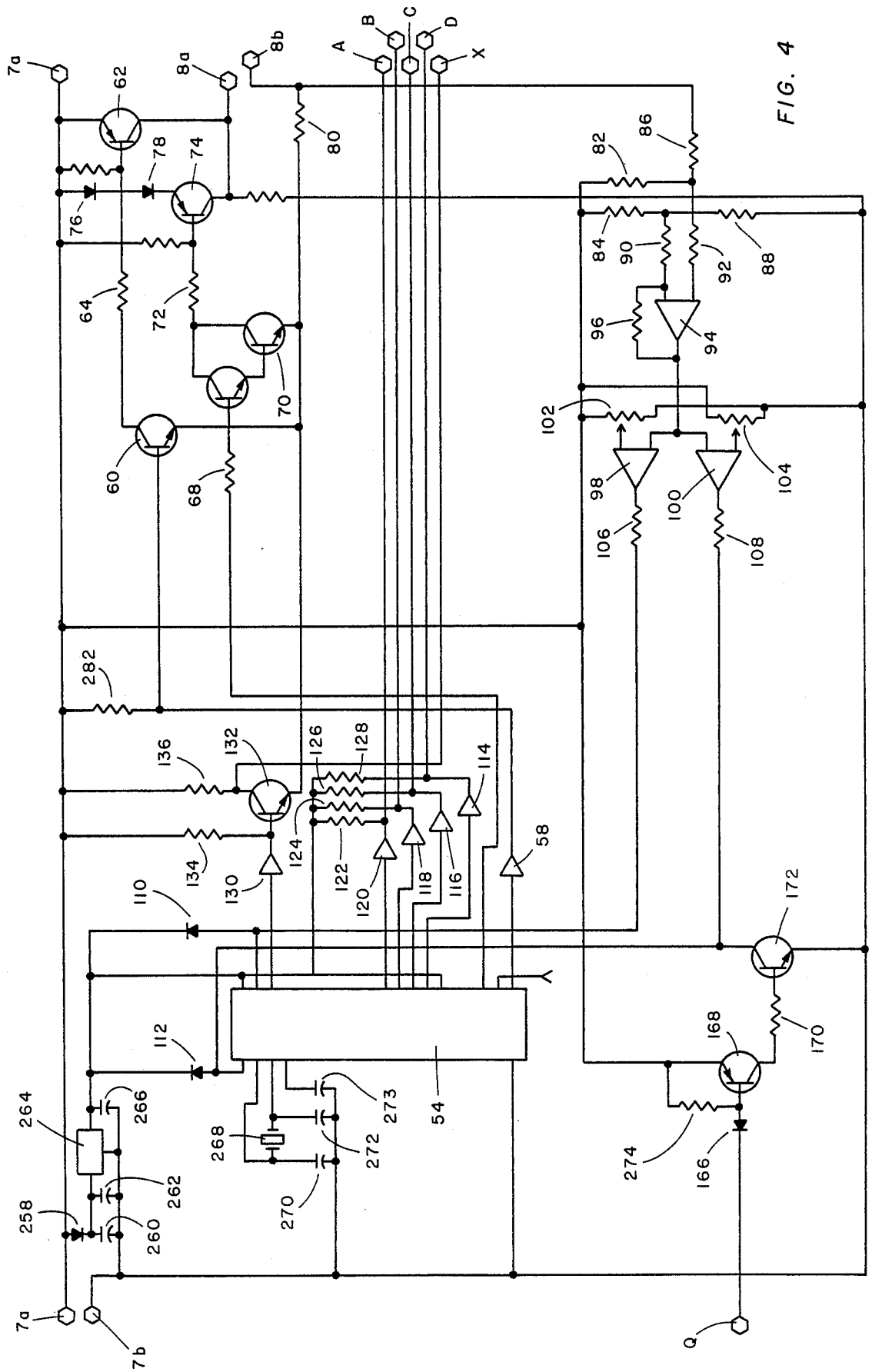
FIG. 4. is a schematic of the central controller of the transponder shown in FIG. 2.
Figure 5:
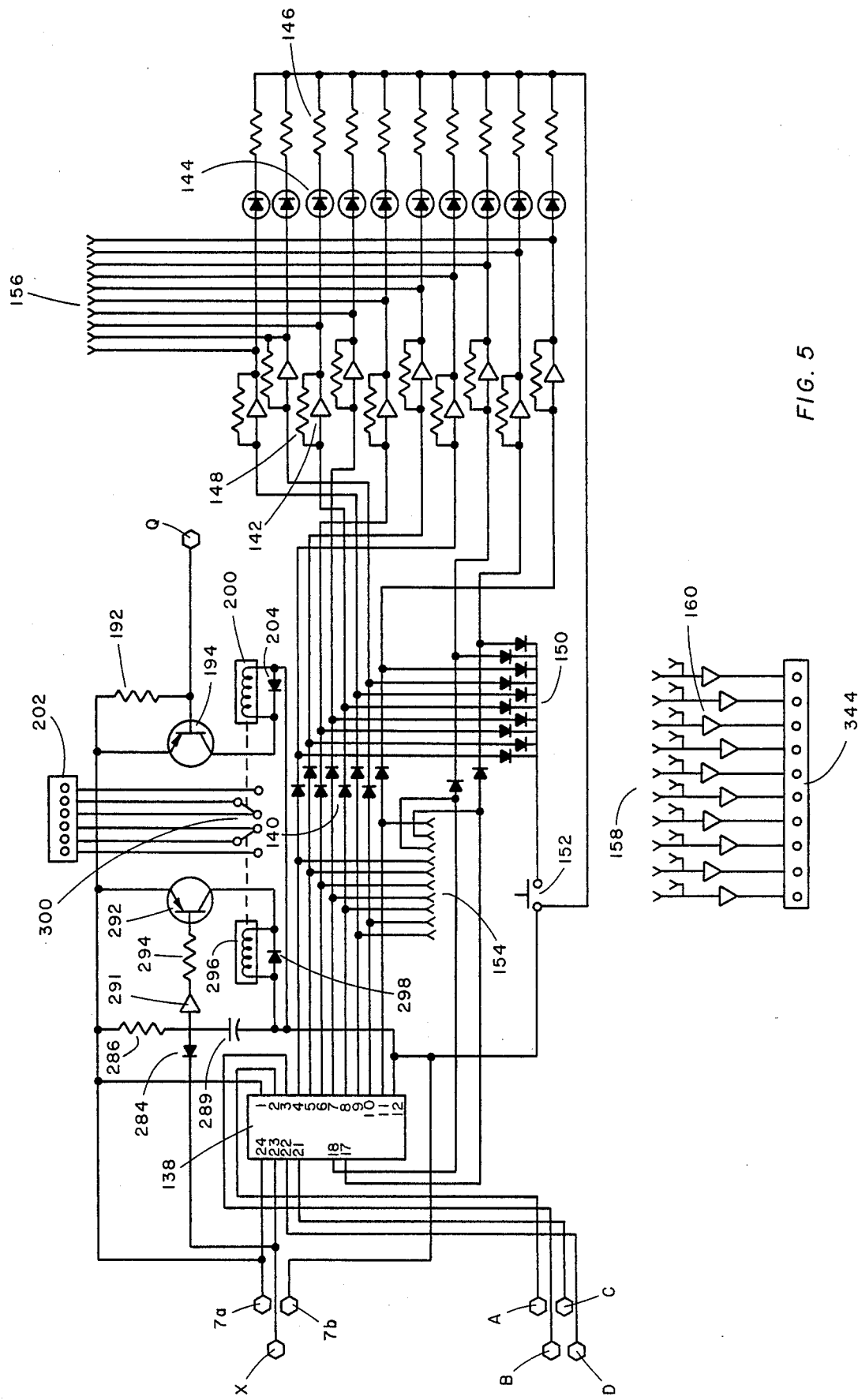
FIG. 5. is a schematic of a portion of the display section of the transponder shown in FIG. 2.

The central controller is shown in FIG. 4 and FIG. 5 discloses the display section. The heart of the control system is the micro processing chip 54. The micro processing chip 54 contains both ROM and RAM as well as the CPU. There are two output ports on the micro processing chip 54. The second port consists of eight output bits, of these three bits are used to generate the transponder 12 signals. The first port is used to signal the display section of the status of the individual transponders, for this purpose 5 of the eight possible bits are used.

Figure 3:
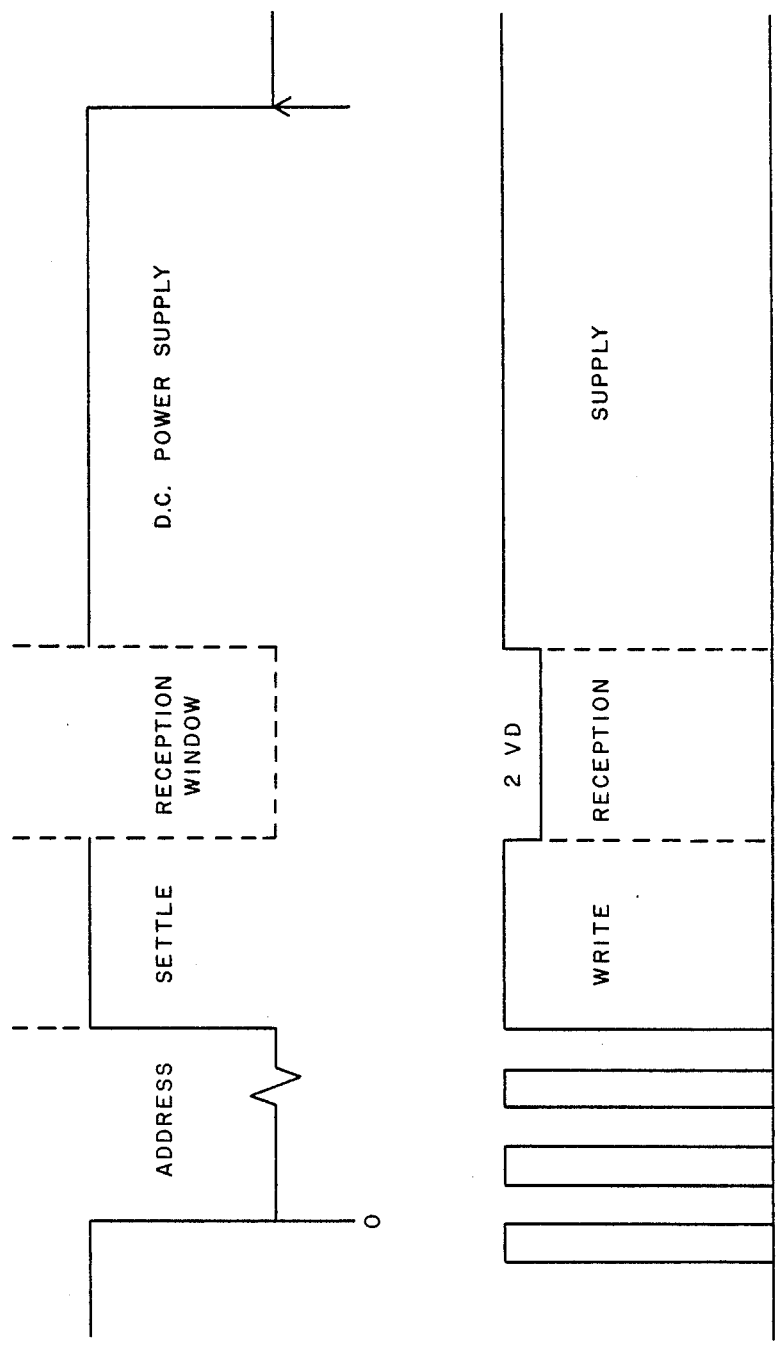
FIG. 3. are timing diagrams.

The central control supplies the identification signals to the transponder(s) 12 which signals determine the specific transponder to be investigated by the system. Turning to FIG. 3, which indicates the timing sequence of the system, starting at some time, shown as time 0, there exists a pulse from the processor 54 for a period of time, the specific time is determined by the number of the address. The address is the identifying signal sent to the transponder 12. The address is formed by a series of pulses, which are essentially square waves with a potential substantially equal either to the supply voltage or to 0 volts. (i.e. either on or off for the power supply line 8) If, for example, address 1 is called for, the address block will be one pulse long, consisting of a single transition from supply voltage to 0 volts then returning to the supply voltage. If address 2 is called for, the address block will be two pulses long and so on. At the end of the address time, a period of time (labeled "settle") is allowed to permit the transponder 12 to answer the inquiry by sending back a signal. This time period is required to allow the reception complete clock 22 of the transponder 12 to time out enabling a possible return signal as hereinbefore described. At the end of this time period the system is ready for a return signal. If this particular transponder 12 is going to return a signal and the return signal itself is actually transmitted transmission will occur during the time period labeled "reception window". At the end of the reception window period, there is a much longer period of time during which power is supplied to the transponder(s) and auxiliary sensing devices attached to the system. Following this the system returns to time 0 and the cycle can be repeated. The cycle is repeated by the controller on a continuing basis, with the micro processing chip 54 continually addressing a transponder 12 and as long as there are no missing transponders or a transponder fails to send a signal back, the cycle is repeated as described above. (Note that no particular order of address is required and the processor may supply addresses in sequence or in a random fashion as determined by its internal program).

In the preferred embodiment the address is made up of one or more 50 microsecond pulses, which are designed to toggle the receiving discriminator in the transponder 12. At the end of the sequence of address pulses, a two hundred microsecond delay occurs during which time the transponder 12 times out and prepares to send a return signal if one is required by circumstances described hereinbefore. During this 200 microsecond delay, power is left on the line to supply power to the detector units. In the transponder 12 the actions previously described occurs. During the reception window time of about 200 microseconds, the micro processing chip 54 sends out a signal momentarily lowering the voltage on the line 8 connecting the transponders and the controller. This control signal is different from that sent during the address time when the power was completely removed from the power line 8. Because of resistive effects the amount of power drawn by the number of detectors connected in parallel would vary with the line voltage. If the circuit relied upon the transponder to add one ampere of power to the line at such a point in time, the change in voltage induced by the resistance and by the lowering of the power supply would lower the consumption of the attached auxiliary unit. This reduction in consumption of the auxiliary sensors, would in effect lower the signal to noise ratio of the return pulse making detection more difficult. To reduce the possibility of this occurring de-coupling diode 216 are connected in series with each auxiliary load. Local filter capacitors supply current to the auxiliary loads during periods when the line potential is less than the potential supplied to the isolation diode plus 1 diode drop. Thus to insure maximum signal to noise ratio in the returned signal, the microprocessor 54 reduces the line potential by two diode drops during the receive window. This insures that the load induced on the supply line by the auxiliary sensors is effectively removed during the period of transmission of any possible return pulse. During the transmission period the transponder 12 also operates from stored charge, the output device is however directly connected to the now unloaded power line for the generation of the return current pulse. Thus the consumption induced on the power line 8 by the accessory devices is removed and the only current on the power line 8, during the time a transponder 12 is sending back its return signal is the current drawn by the transponder 12 output itself. If we look at the voltage on the power line 8, as shown in FIG. 3b, during the address period, it pulses a number of times equivalent to the address, going from essentially 0 volts to line voltage. During the settle period, the voltage on the power line 8 is held high, there being no pulsing. During the reception window time period, the power line 8 voltage is brought two diode drops low and finally during the power supply period, the power line 8 voltage returns to high. All of the aforesaid signals are generated by the microprocessing chip 54, according to the program code built in to the processor. The sequence of events described may also be produced by a system of suitably designed timers and counters, it does not rely on any element inherent to the microprocessor which is used soley to reduce the number of components utilized.

To describe completely the events which occur in the system, assume you are looking at transponder number 3, the program will tell the microprocessing chip 54 to issue a set of three pulses of 50 microsecond duration per pulse, this is accomplished by taking a signal, from #1 port and passing it through a section of a buffer 58 from there applying it to the base of a transistor 60.

When a signal is applied to the buffer 58, it is also applied to the base of the transistor 60 which allows current to flow from the D. C. supply line 7a, 7b into the emitter of the transistor 62. Because the transistor 60 is conducting, current can flow from the emitter of the transistor 62 through a resistor 64 to ground bias the transistor 62 to the on condition and allowing current to flow to the power line 8 and thence to the transponders. The micro processing chip 54 then turns off the gate or buffer 58, bringing the base of the transistor 60 to ground and turning it off. Current no longer flows through the resistor 64 causing the transistor 62 to be biased to the off condition. Any leakage current in transistor 62 is further reduced by connecting the emitter to the base through resistor 106, placing the potential on the power line 8 at zero and resulting in an address pulse being sent to all of the transponders. During the period referred to as settle or wait in FIG. 3, power is applied to the base of the transistor 60 from the buffer 58 to keep transistor 62 on. During the wait period transistor 62 is turned on connecting supply line 7 with the power line 8. During the reception period the buffer 62 is again shut off removing power from the transistor 60 turning transistor 62 off which normally would leave power line 8 at zero potential; however, at the same time instructions are issued by the microprocessor 54, through pin 23, of output port #1 through resistor 68 to the base of transistor 70 (a Darlington transistor) turning it on providing current through resistor 72, allowing current to flow from the emitter to the base of the transistor 74. The transistor 74 receives its emitter supply through the two dropping diodes 76, 78 and therefore transistor 74 is two diode drops lower than the initial voltage on supply line 7a. This lower potential is applied to power line 8 through transistor 74 so that during the receive period the voltage on the power line 8 is two voltage drops lower than that applied through transistor 62. The purpose of this lower voltage is to maintain a signal high enough so that the transponder does not view this particular pulse as address and yet the potential on the power line 8 has been reduced sufficiently to assure that all of the accessories powered by line 8 will be momentary turned off.

In the event that a signal is returned from a transponder during the reception period, the following sequence of events will occur: a current is developed in the power line 8 by the transponding device. At this point in time there is no other electrical load on the power line 8 whatsoever, due to the two diode drop action mentioned heretofore. Thus the only valid signal on the connecting line should be the one amp generated by the answering transponder on the power line 8. This one amp current must pass through sensing resistor 80 creating a voltage drop across the resistor 80. The potential present at each end of the resistor 80 is returned through a pair of voltage dividers to an operational amplifier. Resistors 82, 84 are of equal value, they are both connected to the supply line 7a and are thus at the same potential. The resistor 82 forms a voltage divider with resistor 86 and resistor 84 forms a voltage divider with resistor 88. The resistors 86, 88 are returned to opposite ends of resistor 80 therefore the potential at the junction of resistors 86, 82 differ by the voltage drop across resistor 80, which in turn is applied across resistors 90, 92 to inputs of an operational amplifier 94. The gain of the amplifier 94 is set by resistors 90, 96. The amplifier 94 amplifies the drop across resistor 80 by approximately 10 and this potential is connected to the inputs of the comparator amplifiers 98, 100. The reference potential for the amplifiers 98, 100 are generated by the potentiometers 102, 104. When the voltage at the input of amplifier 98 exceeds the value of potential supplied by resistor 102, the amplifier 98 produces a positive signal which is routed across resistor 106 to the microprocessor 54. This is also true of the amplifier 100 which provides a signal through resistor 108 to a second pin of the microprocessor 54. The values of the current required to trip amplifiers 98, 100 are selected in the following fashion; comparator amplifier 100 is set such that a current with a value from 0.75 to the expected value of the transponder signal would toggle the amplifier 100. If the signal increases where the value of the return current exceeds 175% of a transponder return current value the amplifier 98 will also be tripped. Amplifiers 98, 100 form a window surrounding the average value of a single transponder such that if one, and only one transponder sends back a signal the states of the amplifier 98, 100 will be opposite. If the signal is less than one transponder neither amplifier 98 or 100 will be tripped, if a signal comes back from two transponders simultaneously, then both the amplifiers 98, 100 will become activated. Thus in the described system, the comparator window looks at a signal of 0.75 amp to 1.75 amp as a single transponder, a signal less than 0.75 amp or greater than 1.75 will be treated as an absent signal. These two signals are applied to the input of the microprocessor 54. During the reception time window return signals are interpreted as status signals from a transponder. If the signal actually occurs within the reception window, the microprocessor 54 is prepared to accept the signal at any time during the reception window. To summarize, the dual link device actually functions by sending out the address via the transistors 62, 74; and receives the appropriate signal from a transponder across resistor 80 which is then processed by the amplifiers 98, 100 and applied as logic to the input of the microprocessor 54. Diodes 110, 112 are included so that the signal applied to the microprocessor 54 will not exceed the microprocessor maximum input voltage. They shunt current from the resistors 106, 108, which are at the same potential as the incoming line, and through the diode route it back to the power supply of the microprocessor 54 to assure that the signals applied to the microprocessor 54 are held at levels appropriate for the process.

The remaining components on FIG. 4 and the components on FIG. 5 are part of the display. During the time that a particular device is being addressed, the microprocessor 54 also places on the first port (i.e. pins 27, 28, 29, 30) the binary coded decimal equivalent of the address being queried. If address number one had been sent out, then address number one would be available at the pins of the microprocessor 54. During the time period that an address is being sent out along a line for generation of a response, the address of the selected transponder, addressed serially for at port number two is available at port number one. This is in turn buffered by the gates 114, 116, 118 and 120 which are pulled up to the supply voltage by resistors 122, 124, 126, and 128. A buffered value of the current address is available at points A, B, C, D. In the event there is no return signal resulting from this address, the microprocessor 54 will place a high level logic signal at the input to gate 130. This signal buffered by buffer 130 will be applied to the transistor 132, in this case, causing transistor 132 to cut off. Transistor 62 is normally held on by the voltage drop across resistor 134. There is therefore essentially zero voltage at the junction of the collector of the transistor 132 and resistor 136 and the signal lead going to the display board at point X is normally low. In the event that signal from pin 38 is raised by the lack of a return pulse, transistor 132 will be turned off and the voltage at the junction of its collector and resistor 136 will rise placing a positive potential on point X. There exists on the points A, B, C, D the address of the transponder that is being queried at the moment. This address is applied to the input of the decoder 138 and will result, if the decoder 138 is enabled, in a positive output at the pin having that particular address.

For example, if we have an input on the decoder 138 that is equivalent to station number three, there is a positive signal on both lines A and B and lines C and D are low creating the binary equivalent of three. A logic signal will go high at the pin equivalent to the decoded value of three if the decoder 138 is enabled. At the enable input the decoder 138 is enabled, if and only if, there is an appropriate signal on line X. If the decoder 138 is enabled then it will supply a positive signal through the diode 140 to the input of gate 142 whose output will rise coupling a positive signal through LED 144 through resistor 146 to ground causing LED 144 to glow. At the same time the positive signal is coupled back from the output of the gate 142 through resistor 148 to the input of gate 142 latching gate 142 in the high position. So that even after current ceases to flow through diode 140 gate 142 will remain in the activated or high logic state. In order to reset the LEDs from the alarm condition, a ground signal is introduced through one of the diodes in the array of diodes 150 and reset switch 152. By activating the reset switch 152 current is caused to flow from the gate 142 through one of the diodes 150 to ground, causing the input of the gate 142 to go low, forcing the output of the gate to go low as well. Due to the coupling effect of the latching resistor 148, once a state is realized, the gate is forced to remain in the state. This same description would apply to any one of the diodes in the diode array 150. Two types of signals exist in the display circuit represented by the points 154 and 156. The signal at point 154 rises only when a signal is decoded by the decoder 138 (i.e. only when an alarm condition is detected at a particular transponder address). When an alarm condition is no longer detected point 154 returns to a low potential. The points 156 track the condition of the LED's 144, so that if the LED is activated, the respective point 156 will be high and if not activated the respective point 156 will be low. Thus, the points 156 are a latch state for an alarm condition. Points 154 and 156 are supplied for remote telemetry of the unit. The operator by selecting a jumper between one of the points 154 or points 156 and a point 158 tailors the input to buffer gate 160 so that the buffer 160 reflects either the "only when in alarm condition" or "once tripped condition".

Figure 6:
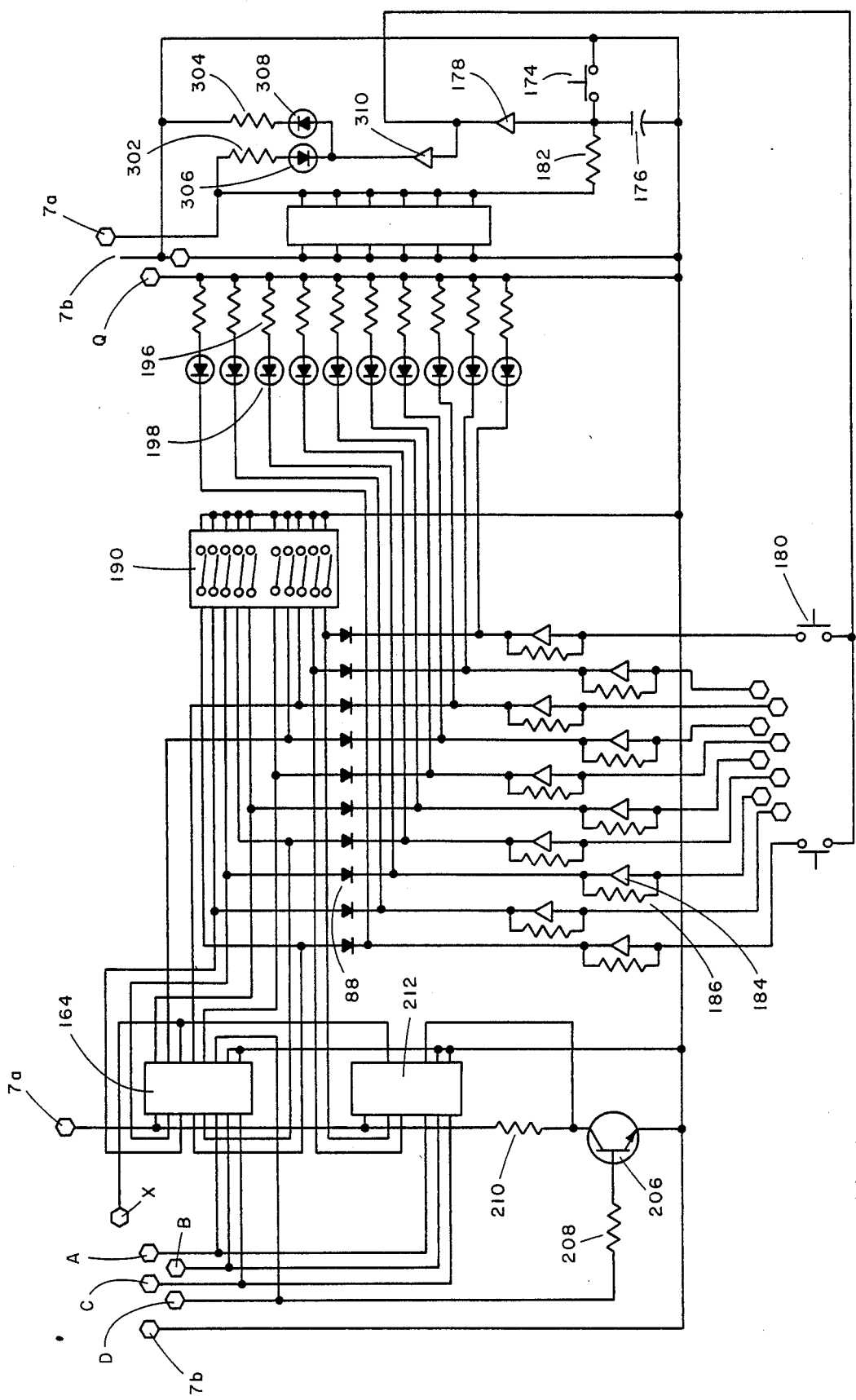
FIG. 6. is a schematic of another portion of the display section of the transponder shown in FIG. 2.

We now take up the shunt control aspect of the system as shown in FIGS. 5 and 6. In some cases not all of the transponder addresses will be completely utilized and we wish to avoid activating unused displays in a system that has less than ten transponder units attached. In other cases, we may wish to temporarily disable one of the signal zones to allow a transponder to report an error condition without triggering a display. Therefore there exist two possible requirements for ignoring a non-return state from a transponder 1. a permanent elimination of the zone for a particular system or 2. a temporary removal of a transponder from the monitored group. If a permanent removal of an address is to be installed, the corresponding section of multiposition switch 190, representing the transponder address to be ignored by the system, is closed to ground this indicates that the zone is permanently shunted. This information is returned to the microprocessing chip 54 via the decoder 164, which receives the same address information as the decoder 138. The station currently addressed by the microprocessing chip 54 is applied to the input of the decoder 164. If the number applied to the input of the decoder 164 is the same as the address we are currently attempting to enable then that information is transmitted by decoder 164 back to the microprocessing chip 54 through the diode 166 to the base of transistor 168. Transistor 168 through resistor 170 turns on transistor 172. Transistor 172 then clamps the output of the operational amplifier 100 through the resistor 108 to give the same information to the microprocessing chip 54 as would occur if a valid return had been sent for this address. This operation artificially introduces a return signal in spite of the fact that when this address is transmitted a transponder will not send a return signal. There is also special circuitry, shown in FIGS. 5 & 6, which permits temporary elimination of transponder addresses from the group being monitored. Assume that the operator wishes to temporarily eliminate the monitoring of one of the zones, the following sequence is followed: a key lock switch 174 is activated, discharging the charged capacitor 176 placing the input of the gate 178 at a low potential. For some time after the key to the switch 174 is released, in the preferred embodiment this is a period of approximately 30 seconds, the value of the potential across the capacitor 176 does not exceed the switching level of gate 178. This is due to the fact that time is necessary to charge the capacitor 176 through resistor 182. During this time, the output of gate 178 is also low. If the push button 180, which is part of a array of switches with one switch for each possible address, is depressed during this interval the input to gate 184 will be momentarily pulled low. As setforth hereinbefore this low state is latched by the resistor 186. The low potential at the output of the gate 184 is coupled through the diode 188 to the signal line controlled by dip switch 190 creating a condition which is the same as if the dip switch 190 was closed thereby sending a shunt signal back to the microprocessing chip 54. As shown in FIG. 6, the resistors 302, 304 are current limiting resistor for the LED's 306, 308 which function as shunt status indicators driven by a buffer amplifier 310. The LED's 306, 308 indicate the ability to enter shunt information. In addition, current also flows from the power supply through the resistor 192 to the emitter base junction of the transistor 194 through resistor 196 into the LED 198 causing it to glow and the current then flows back into gate 184. This activation of the LED 198 will continue until the shunting state is released. Note that when the operator inserts a shunting key and turns it to a spring loaded position, the contacts of the shunt switch 174 are closed charging the capacitor 176. When the key is released, spring urged back to its original position, the capacitor 176 starts to discharge through a resistor 182. When any of the temporary zone elimination circuits is functional, causing a current to flow through one of the indicating LED lamps, a current also passes through the emitter base junction of transistor 194. As a consequence of passing current through the emitter base junction of transistor 194, it is biased on causing current to flow into the relay 200 to ground.

The relay 200 closes transmitting a signal to an optional remote telemetry, through the terminal board 202, which indicates that a shunt condition exists. Diode 204 across the terminals of the relay provides protection for transistor 194 from the stored energy in the relay that is released when the relay again opens when a zone is again released to the monitoring system. The function of the temporary elimination circuitry is identical regardless of the address involved. After the time period for enabling, the voltage on the capacitor 176 will eventually return to a level close to ground, this in turn will result in the gate 178 output returning to the high state. If at any time after gate 178 has been set high, push button 180 is again depressed the high state of the gate 178 will be established by the resistor 186 and the shunt condition will be removed. Thus the same push button 180 can institute a shunt condition or a release of the shunt condition depending on the amount of time that has elapsed after the shunt switch 174 is activated. If the push button 180 is depressed directly after activating the switch 174 a shunt condition will be enabled, if the push button 180 is depressed some time after activating the switch 174 a shunt condition will be released. Therefore, access to a means of activating the switch 174 must be available to eliminate a transponder from the monitoring circuit, but this same access to the switch 174 is not required to release this shunt. The function of the transistor 206 and its satellites, the input resistor 208 and the collector resistor 210, is to extend the number of positions that can be decoded by the decoder 164, which only has eight channels, to ten channels by adding the supplemental decoder 212. The transistor 206 switches between the decoder 164 and the decoder 212. For addresses 9 and 10 decoder 212 is selected and for addresses 0–8 decoder 164 is selected. This is accomplished by making use of the bit from processor 54 that represents numbers greater than or equal to 8. This signal is applied to both switch blocks at their inhibit lines causing one or the other of the blocks to be inhibited at any particular time. The signal is so processed that during addresses of from 0 to 7 the first block is non-inhibited and that for addresses 9 and 10 the second block is non-inhibited. Extension for addresses of up to 16 is possible with this expansion scheme although in the disclosed embodiment only 10 addresses are used.

The power supply diode 214 isolates the power supply of the transfomer from the line. The diode 216 isolates the power supply of an active sensor. The resistor 218 is a termination resistor which assures that the transponder presents a minimum load. A capacitor 220 is the filter capacitor for the transponder power supply. A capacitor 222 is RF by pass for the transponder power supply. The resistor 224 is a pull up resistor for the alarm input. The resistor 226 couples back voltage into the input of the two comparators 228, 230. The comparators 228, 230 compare the input from the resistor 226 with the input from the divider network comprising the resistors 232, 234 and 236. They establish the trip points for the comparators. The capacitor 238 provides a short time delay upon the input voltage to avoid effects due to impact shock. The diodes 240, 242 at the output of the comparators 228, 230 make the output of the comparators 228, 230 unidirectional. The diodes 240, 242, 244 and 246 all form an AND gate to control the output transistor 50. The outputs controlled by the diodes 244, 246 are the actual physical decoding of the address by the transponder. The transponder responds after a particular time period by raising the anode of the diodes 244, 246.

In FIG. 4 note the following standard electrical elements the power supply diode 258, the power supply filter capacitor 260, the capacitor 262 is RF by pass for the transponder power supply, the regulator 264, the post filter 266, the micro processor crystal 268, crystal padders 270, 272, reset microprocessor power on reset capacitor 273, pullup resistor 274 and transistor 168. The resistor 282 is a base drive resistor for the transistor 168.

As shown in FIG. 5, The diode 284, the resistor 286 and the capacitor 289 form a pulse stretching network used to stretch the alarm signal condition before application to the relay drive. The stretched signal is applied to a non inverting buffer 291 which drives the base of transistor 292. The current is limited by the resistor 294. The relay element 296 generates a signal in the alarm condition. The diode 298 is a protective diode. The relay contacts are numbered 300.

A special modification of the transponder is used to allow the controller to send information to a remote device such as a sounder or a light. In the transponder 12 an auxiliary flip-flop circuit is used to decode the passage of the unit through a count of ten (10). Since the decoder is a decimal device, it decodes to a maximum count of 9 and then starts counting again. To make use of the second set of ten counts (i.e. a second pass though the series) the counted sets the flip-flop as it passes thought the count of zero for the second time after being enabled. The output of the flip-flop is used as an added input to control the output device, thus if an address below 10 is transmitted, a transponder with this option will not respond in spite of the fact that a proper address has been loaded into the counter. If the address is greater than 10, the counter and the enabling circuitry will both be satisfied, and a valid output will occur as hereinbefore described. This output is then available to external circuitry to activate remote devices attached to the transponder, the transponder operation can be conditioned by the nature of the control program in microprocessor 54 to provide desired output conditions resulting from the monitoring of the transponder zones.

In the preferred embodiment, the transponder output is utilized to constantly activate a one-shot circuit in a remote sounding device, keeping the device in a quiet state, if the signal is discontinued, either by disconnecting the data/power line or by the program detecting an alarm condition, the one-shot is allowed to time out and activate the sounding device. The extension to other devices in a similar fashion is easily accomplished by similar techniques.

What I claim is:

1. The combination of a power line and a transponder, the transponder comprising a level detector, a shaper, a counter, a master reset clock, a reception complete clock, a decoder, a line driver and a comparator, the line driver having a switch, the power line being connected to the level detector, which in turn being connected to the input of the shaper, the shaper being connected to the counter, the master reset clock and the reception complete clock, the master reset clock being connected to the counter and the reception complete clock being connected to the decoder and the switch being connected to the comparator, the shaper including an input and an output, the combination including a first resistor and a zener diode, first, second, third and fourth comparators, the first resistor and the zener diode connected in series to the base of a first transistor, the first transistor connected to a second resistor and being connected to the input of the shaper, the master reset clock having an input and an output, the output of the shaper electrically connected to the inputs of the first and second comparators, the third and fourth comparators including outputs, the fourth comparator being connected to the master reset clock and the reception complete clock, a first capacitor being connected to both the master reset clock and the reception complete clock.

2. The combination of a power line and a transponder as set forth in claim 1 further comprising a third resistor, a divider network including a fourth resistor, a fifth resistor and a sixth resistor, the divider network and the third resistor electrically connected to the inputs of the third and fourth comparators and the third resistor and the divider network providing inputs whereby the third and fourth comparators compare the input from the third resistor with the input from divider network establishing trip points for the third and fourth comparators.

3. The combination of a power line and a transponder as set forth in claim 2 further comprising a first diode connected to the output of the third comparator, a second diode connected to the output of the fourth comparator, a third diode electrically connected to the output of the reception complete clock, a fourth diode electrically connected to the output of the master reset complete clock, the diodes forming an AND gate to control the output transistor.

* * * * *